United States Patent [19]

O'Connor et al.

[11] Patent Number: 4,496,684

[45] Date of Patent: Jan. 29, 1985

[54] URETDIONE GROUP-CONTAINING POLYURETHANE OLIGOMERS AND AQUEOUS DISPERSIONS THEREOF

[75] Inventors: James M. O'Connor, Clinton; Wilhelm J. Schnabel, Branford, both of Conn.

[73] Assignee: Olin Corporation, Cheshire, Conn.

[21] Appl. No.: 616,349

[22] Filed: Jun. 1, 1984

[51] Int. Cl.$^3$ .............................................. C08G 18/38
[52] U.S. Cl. ................................. 524/591; 427/385.5; 528/67; 528/73
[58] Field of Search ..................... 528/73, 67; 524/591; 427/385.5

[56] References Cited

U.S. PATENT DOCUMENTS

| | | | |
|---|---|---|---|
| 3,099,642 | 7/1963 | Holtschmidt et al. | 528/64 |
| 3,248,370 | 4/1966 | Reischl et al. | 528/73 |
| 3,923,713 | 12/1975 | Hermann | 528/69 |
| 3,993,641 | 11/1976 | Tiemann et al. | 260/239 A |
| 4,044,171 | 8/1977 | Muller et al. | 427/27 |
| 4,238,378 | 12/1980 | Markusch et al. | 528/67 |
| 4,336,365 | 6/1982 | Reischl et al. | 526/230 |
| 4,413,079 | 11/1983 | Disteldorf et al. | 528/59 |

FOREIGN PATENT DOCUMENTS 944309  12/1963  United Kingdom .

OTHER PUBLICATIONS

Saunders et al., *Polyurethanes,* Part I, Interscience, NY, 1962, pp. 91-94.

*Primary Examiner*—Maurice J. Welsh
*Attorney, Agent, or Firm*—William D. Sabo

[57] ABSTRACT

Uretdione group-containing polyurethane oligomers are prepared by reacting a hydroxyl-terminated prepolymer with a dicarboxylic acid anhydride. The hydroxyl-terminated prepolymer is the reaction product of a uretdione group-containing organic polyisocyanate with an isocyanate reactive hydrogen atom-containing compound. The polyurethane oligomers are useful in the preparation of aqueous polyurethane dispersions, which can be used as adhesives in making molded wood products, and as coatings and other useful products.

25 Claims, No Drawings

URETDIONE GROUP-CONTAINING POLYURETHANE OLIGOMERS AND AQUEOUS DISPERSIONS THEREOF

This invention relates to uretdione group-containing polyurethane oligomers of hydroxyl-terminated prepolymers and dicarboxylic acid anhydrides and to their use in the preparation of aqueous polyurethane dispersions. The invention further relates to the use of these aqueous polyurethane dispersions as adhesives, coatings, etc.

It is known in the art that aqueous dispersions can be made from polyurethanes by employing emulsifiers. However, aqueous polyurethane dispersions of this type are generally unstable, and the emulsifiers tend to interfere with subsequent use of the dispersions as adhesives, coatings and so forth.

Another approach involves incorporating carboxylic acid groups into the polyurethane structure. It is difficult, however, to disperse in water a polyurethane of relatively high molecular weight, even if it contains a substantial percentage of carboxylic acid groups. For certain practical applications, it would be desirable to employ aqueous polyurethane dispersions derived from high molecular weight polyurethanes.

Now, according to the invention, an improved polyurethane oligomer has been developed which contains a uretdione group. The polyurethane oligomer has a free OH content from about 0.2 to about 10 percent and a carboxylic acid group content from about 0.6 to about 13 percent and is prepared by reacting a hydroxyl-terminated prepolymer with a dicarboxylic acid anhydride. The hydroxyl-terminated prepolymer is the reaction product of a uretdione group-containing organic polyisocyanate with an isocyanate reactive hydrogen atom-containing compound. It has been found that the polyurethane oligomer products can be readily employed in preparing aqueous polyurethane dispersions of excellent stability. In addition, the aqueous polyurethane dispersions thus obtained may be desirably used in applications requiring elevated curing temperatures. Upon heating, the uretdione group is cleaved to provide isocyanate groups which react with available hydroxyl groups to form urethane polymers of high molecular weight.

In accordance with the invention, the polyurethane oligomer is prepared by first reacting a uretdione group-containing organic polyisocyanate with an isocyanate reactive hydrogen atom-containing compound in an equivalent ratio of NCO to OH ranging from about 1/6 to about 1/1.8, using standard procedures, to yield a hydroxyl-terminated prepolymer of controlled molecular weight. Preferably, the equivalent ratio of NCO to OH ranges from about ⅓ to about ½.

In preparing the hydroxyl-terminated prepolymer, any suitable organic polyisocyanate containing a uretdione group may be used. These uretdione group-containing organic polyisocyanates can be prepared in accordance with well-known methods by dimerization of the corresponding organic polyisocyanate. See Saunders, J. H. and Frisch, K. C., *Polyurethane: Chemistry and Technology, Part I,* pages 91–94 (1962). Any suitable dimerization catalyst can be employed, such as phosphines, e.g. trialkylphosphines, tertiary amines, e.g. pyridine, etc. The reaction temperature and time can be varied broadly over wide ranges, depending on the polyisocyanate to be dimerized, the nature and amount of the catalyst employed, and so forth. Dimerization may also be carried out in the absence of a catalyst at elevated temperatures, generally above about 120° C. In carrying out the dimerization reaction, a suitable inert organic solvent may be utilized, although the reaction may also be performed in the absence of a solvent.

Any suitable organic polyisocyanate, or mixture of polyisocyanates, which is susceptible to dimerization can be used. Typical examples include the following and mixtures thereof: 2,4-toluene diisocyanate; 2,6-toluene diiosycanate; isomeric mixtures of 2,4- and 2,6-toluene diisocyanate; ethylene diisocyanate; propylene diisocyanate; methylene-bis (4-phenyl isocyanate); methylene-bis (4-cyclohexyl) isocyanate; xylene diisocyanate; 3,3'-bitoluene-4-4'-diisocyanate; hexamethylene diisocyanate; naphthalene 1,5-diisocyanate; isophorone diisocyanate; and the like. Preferred organic polyisocyanates include: 2,4-toluene diisocyanate; 2,6-toluene diisocyanate; isomeric mixtures of 2,4- and 2,6-toluene diisocyanate in which the weight ratio of the 2,4-isomer to the 2,6-isomer is from about 60:40 to about 90:10, and more preferably from about 65:35 to about 80:20; and methylene-bis (4-phenyl isocyanate). In accordance with a particularly preferred embodiment of the invention, 2,4-toluene diisocyanate is employed.

The isocyanate reactive hydrogen atom-containing compound preferably should have a molecular weight from about 62 to about 7,000, and more preferably from about 100 to about 3,000. The average functionality usually ranges from about 2 to about 8, and preferably from about 2 to about 4.

Suitable isocyanate reactive hydrogen atom-containing compounds include low molecular weight compounds having at least two isocyanate reactive hydrogen atoms and a molecular weight from about 62 to about 400, polyester polyols, polyether polyols and mixtures of two or more such compounds. Examples of such low molecular weight compounds include: ethylene glycol, 1,2-propylene glycol, 1,3-propylene glycol, 2,3-butylene glycol, 1,5-pentane diol, 1,6-hexane diol, neopentyl glycol, glycerol, trimethylolpropane, trimethylolhexane, pentaerythritol, 2-methyl glucoside, sorbitol, monoethanolamine, diethanolamine, triethanolamine, and the like, and mixtures thereof.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic, terephthalic, and the like, and mixtures thereof. Illustrative polyhydric alcohols include various diols, triols, tetrols and higher functionality alcohols, such as ethylene glycol, 1,2-propylene glycol, 1,3-propylene glycol, 2,3-butylene glycol, 1,5-pentane diol, 1,6-hexane diol, neopentyl glycol, glycerol, trimethylolpropane, trimethylolhexane, pentaerythritol, 2-methyl glucoside, sorbitol, and the like, and mixtures thereof.

Suitable polyether polyols include various polyoxyalkylene polyols and mixtures thereof. These can be prepared, according to well-known methods, by condensing an alkylene oxide, or a mixture of alkylene oxides using random or step-wise addition with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth.

The polyhydric initiator used in preparing the polyether polyol reactant includes the following and mixtures thereof: (a) aliphatic diols, such as ethylene glycol, 1,2-propylene glycol, 1,3-propylene glycol, 2,3-butylene glycol, 1,5-pentane diol, and the like; (b) aliphatic triols, such as glycerol, trimethylolpropane, triethylolpropane, trimethylolhexane, and the like; (c) higher functionality alcohols, such as pentaerythritol, methyl glucoside, sorbitol, and the like; (d) polyamines, such as tetraethylene diamine; and (e) alkanolamines, such as diethanolamine, triethanolamine, and the like.

A preferred group of polyhydric initiators for use in preparing the polyether polyol reactant is one which comprises aliphatic diols, triols and tetrols such as ethylene glycol, 1,2-propylene glycol, 1,3-propylene glycol, dipropylene glycol, glycerol, trimethylolpropane, 2-methyl glucoside, and the like.

In preparing the polyether polyol, the oxyalkylation reaction is allowed to proceed until the desired molecular weight is reached, at which time the reaction is terminated and the resulting polyol is recovered. As noted above, the molecular weight of the resulting polyether polyol preferably ranges from about 62 to about 7,000; more preferably, the polyether polyol has a molecular weight of about 100–3,000.

A particularly preferred isocyanate reactive hydrogen atom-containing compound for use in the practice of the invention is trimethylolpropane.

Preferably, the reaction between the uretdione group-containing organic polyisocyanate and the isocyanate reactive hydrogen atom-containing compound is carried out in the presence of a suitable organic solvent. A wide range of solvents may be employed and, in fact, any inert organic solvent in which the reactants are relatively soluble can be used. Useful solvents include, for example, monochlorobenzene, o-dichlorobenzene, p-dichlorobenzene, tetrahydronaphthalene, benzene, toluene, xylene, the chlorotoluenes, the trichlorobenzenes, carbon tetrachloride, trichloroethylene, tetrahydrofuran, etc. Common urethane catalysts, e.g., tertiary amines and metal compounds such as stannous octoate, dibutyltin dilaurate or dibutyl (lauryl mercapto) tin, may be used to accelerate the reaction. The actual reaction conditions such as temperature and time may vary over wide ranges. Generally, a reaction temperature from about 50° C. to about 120° C., and preferably from about 60° C. to about 110° C., is employed. The reaction time may vary considerably depending generally on the temperature so as to insure a completion of the reaction.

To form the polyurethane oligomer that is utilized according to the invention, the prepared hydroxyl-terminated prepolymer, as defined above, is then reacted with an anhydride derived from a dicarboxylic acid. The reaction is carried out employing such relative proportions of the reactants so as to achieve an oligomer product having a final free OH content from about 0.2 to about 10 percent, preferably from about 0.5 to about 7 percent, and most preferably from about 1 to about 4.2 percent. The polyurethane oligomer also has a carboxylic acid group content from about 0.6 to about 13 percent, preferably from about 1.3 to about 11.1 percent, and most preferably from about 2.5 to about 6.3 percent.

Any suitable anhydride which is derived from an aliphatic or aromatic dicarboxylic acid may be used. The anhydride which is employed may be unsubstituted or it may be substituted with any of a variety of substituents, e.g., alkyl, halo, haloalkyl, cycloaliphatic, aryl, and the like. Illustrative dicarboxylic acid anhydrides include: aliphatic dicarboxylic acid anhydrides such as maleic ahydride, succinic anhydride, glutaric anhydride, citraconic anhydride, 2,3-dimethylmaleic anhydride, camphoric anhydride, cis-1,2-cyclohexane dicarboxylic anhydride, and the like; and aromatic dicarboxylic acid anhydrides such as phthalic anhydride, tetrabromophthalic anhydride, and the like. Preferred dicarboxylic acid anhydrides for use in the practice of the invention include unsubstituted and substituted maleic anhydrides, succinic anhydrides and glutaric anhydrides. Unsubsituted maleic anhydride, succinic anhydride and glutaric anhydride are the most preferred. By reaction of the hydroxyl-terminated prepolymer with the dicarboxylic acid anhydride, a controlled molecular weight polyurethane oligomer with terminal carboxylic acid groups is produced.

In carrying out the reaction between the hydroxyl-terminated prepolymer and the dicarboxylic acid anhydride, the reaction temperature and time will both depend upon many factors. In most situations, however, reaction temperatures from about 50° C. to about 120° C. and reaction times from about 0.5 hours to about 10 hours are preferred. If the prepolymer is formed in the presence of an organic solvent, ordinarily the dicarboxylic acid anhydride will be added, without first removing the solvent from the reaction mixture. It should also be noted that common urethane catalysts, such as those mentioned above, may also be used, if desired, in order to accelerate the reaction.

The polyurethane oligomers of the present invention are particularly suited for use in making aqueous polyurethane dispersions. This may be accomplished by simultaneously, (i) neutralizing the carboxylic acid groups in the polyurethane oligomer with a suitable neutralizing agent; and (ii) dispersing the polyurethane oligomer in an aqueous solution.

Any suitable neutralizing agent may be employed. Preferred agents include water soluble alkali metal hydroxides, alkali metal carbonates, alkali metal bicarbonates, ammonia, amines and mixtures thereof. The preferred neutralizing agent is sodium hydroxide.

The amount of neutralizing agent added is preferably sufficient to neutralize substantially all of the carboxylic acid groups in the polyurethane oligomer. This amount may be determined by measuring the actual acid number of the polyurethane oligomer.

The amount of water employed will depend upon the application for which the aqueous polyurethane dispersion is to be used. Generally, an amount of water is used such that the final dispersion will contain, from about 20 to about 80 percent by weight solids.

Preferably, the aqueous polyurethane dispersion is prepared by simultaneously neutralizing the carboxylic acid groups in the polyurethane oligomer and dispersing the polyurethane oligomer in an aqueous solution. Alternatively, it may be advisable in certain situations to neutralize the carboxylic acid groups either before or after the polyurethane oligomer is added to the aqueous solution. Preferably, the neutralizing and dispersing steps are carried out at a temperature ranging from about 25° C. to about 75° C.

If desired, other standard ingredients such as chain extenders may be added. For example, suitable chain extenders include compounds having two active hydrogen-containing groups and a molecular weight from about 18 to about 200 such as diols, diamines, hydrazines, dihydrazides and the like. Specific examples include ethylene glycol, diethylene glycol, 1,2-propylene glycol, 1,3-propylene glycol, 1,4-butanediol, and the like.

The aqueous polyurethane dispersion may include other conventional materials such as pH adjusters, monoisocyanates and the like. Thickening agents may be added to the aqueous polyurethane dispersion to produce adhesives and coatings having an acceptable viscosity. Suitable thickening agents include those conventionally known in the art [see U.S. Pat. No. 3,923,713 (Hermann)] such as methyl cellulose, hydroxyethyl cellulose, polyacrylic emulsions, etc.

These dispersions may be blended with other dispersions [see U.S. Pat. No. 4,238,378 (Markusch et al.)]. Furthermore, fillers (e.g., carbon black and aluminum clay), plasticizers, pigments and various other additives familiar to those skilled in the art also may be added.

If an organic solvent was employed in the preparation of the polyurethane oligomer, it may be distilled off and a portion of it may be replaced with additional water.

The aqueous polyurethane dispersions of the present invention may be used as coatings and adhesives for fabrics, plastics, wood, metals and the like because of their advantageous properties such as their desirable toughness, elasticity, durability, etc.

The described aqueous polyurethane dispersion is used in the manufacture of lignocellulosic composite materials. The process of the invention is carried out by contacting a plurality of lignocellulosic particles with a binder composition comprising the described aqueous polyurethane dispersion. The contacted particles are thereafter formed into a composite material by the application of heat and pressure.

Particles of any suitable lignocellulosic material may be employed according to the process of the invention. Illustrative materials containing lignocellulose include: wood chips, wood fibers, planar shavings, sawdust, bark, cork and the like, as well as straw, flax, bagasse, bamboo, dried weeds and grasses, corn stalks, hulls from cereal crops such as rice and oats, sisal, and so forth. The moisture content of the lignocellulosic particles typically ranges from about 2 to about 25 percent, and preferably from about 8 to about 20 percent, by weight.

For purposes of illustration, the aqueous polyurethane dispersion will be used to produce particle board in the description which follows. It is to be understood, however, that the aqueous polyurethane dispersion can be suitably employed in the manufacture of any type of lignocellulosic composite material, such as, for example, chip board, wafer board, fiber board, etc., as will be readily apparent to those skilled in the art.

In the manufacture of particle board, the lignocellulosic particles may be conveniently contacted with the aqueous polyurethane dispersion by mixing the particles with the aqueous polyurethane dispersion while the particles are being blended or agitated in an enclosed blender or like mixing apparatus. Any suitable amount of the aqueous polyurethane dispersion may be employed in making particle board according to the process of the invention. Generally speaking, the aqueous polyurethane dispersion is used in a proportion ranging from about 4 to about 40 percent by weight based on the dry weight of the particles. For most applications, it is preferred to employ from about 10 to about 20 percent by weight of the aqueous polyurethane dispersion. If desired, other standard materials, such as fire retardants, pigments, and the like, may also be added to the particles during the blending step.

The treated particles are blended sufficiently to form a uniform mixture, which is then formed into a loose mat or felt. The mat is subsequently placed in a heated press between caul plates and compressed to the desired extent. The actual pressing conditions, i.e. temperature, pressure and time, may vary over wide ranges and are generally dependent on the desired thickness and density of the board being produced, the size of the particles used and other factors familiar to those skilled in the art. In general, however, temperatures ranging from about 250° F. to about 450° F. and pressures ranging from about 400 psi to about 800 psi for a period of about 3 minutes to about 20 minutes are typical.

The above-described process can be carried out batchwise or in a continuous manner, as should be readily apparent to those skilled in the art. It is also within the scope of the invention to apply a release agent to the metal surfaces of the press before a manufacturing run is commenced, if desired. This may aid in insuring that minimal adherence of the particle board to the metal surfaces takes place. Any material known to those in the art as being suitable as a release agent may be employed, e.g. iron, calcium or zinc stearate compounds.

The aqueous polyurethane dispersion of the present invention may also be used in conjunction with conventional thermosetting resin binders, such as phenol-formaldehyde, resorcinol-formaldehyde, melamine-formaldehyde, urea-formaldehyde, urea-furfural, and the like. Other modifications should be readily apparent to those skilled in the art.

The lignocellulosic composite materials produced in accordance with the invention have excellent physical properties and may be used in any of the customary areas of application for such materials.

As noted above, the aqueous polyurethane dispersion can also be suitably employed as a coating composition. In accordance with the invention, the aqueous polyurethane dispersion is applied to a suitable substrate and cured according to conventional procedures well known to those skilled in the art.

The following examples are provided to further illustrate the invention. All parts and percentages are by weight unless otherwise specified.

Preparation of Hydroxyl-Terminated Prepolymers

EXAMPLE 1

A 500 ml flask, equipped with stirrer, thermometer and reflux condenser, was charged with 125 ml dry tetrahydrofuran (THF) and 9.62 grams (0.072 mole) trimethylolpropane. The mixture was heated under nitrogen to 55° C., and 12.5 grams (0.036 mole) uretdione group-containing diisocyanate[1] was added gradually in small portions maintaining the temperature at 55°-60° C. Heating at mild reflux was continued for several hours until IR analysis of the mixture had shown that the typical absorption for the NCO groups (4.5μ) had disappeared. After evaporating the THF solvent, the prepolymer was obtained in quantitative yield as a solid, powdery material. IR analysis showed that the uretdione configuration was maintained.

[1] Derived from 2,4-toluene diisocyanate.

EXAMPLE 2

The procedure of Example 1 was followed, except that 77 grams (0.57 mole) trimethylolpropane and 1000 ml dry THF were charged in a two liter flask. 100 Grams (0.29 mole) uretdione group-containing diisocyanate[1] was added gradually in small portions at 55°–60° C., and the mixture was heated at mild reflux until the reaction was completed according to IR analysis. The reaction product, admixed with THF, was divided into three portions for use in Examples 3–5 below.

[1] Derived from 2,4-toluene diisocyanate.

PREPARATION OF POLYURETHANE OLIGOMERS

EXAMPLE 3

54.0 Grams (0.088 mole) of the product of Example 2 was heated to 55° C. 0.4 Gram catalyst[1] and 8.63 grams (1.0 eq.) maleic anhydride were added and heated until IR analysis showed completion of the reaction by disappearance of the absorption at 5.37μ. Evaporation of the THF solvent gave a dry solid material, melting in the range of 126°–133° C. Analysis of the polyurethane oligomer gave an acid number of 64.6, somewhat lower than calculated (78.5). IR analysis showed that the uretdione configuration was maintained.

[1] 2-dimethylaminopyridine.

EXAMPLE 4

53.0 Grams (0.086 mole) of the product of Example 2 was reacted with 12.65 grams (1.5 eq.) maleic anhydride in accordance with the procedure of Example 3. The final dry, solid reaction product, melting in the range of 121°–129° C., had an acid number of 92.6 (Theory 110.2). IR analysis showed that the uretdione configuration was maintained.

EXAMPLE 5

53.4 Grams (0.087 mole) of the product of Example 2 was reacted with 17.0 grams (2.0 eq.) maleic anhydride in accordance with the procedure of Example 3. The final dry, solid reaction product, melting in the range of 118°–124° C., had an acid number of 117.0 (Theory 138.0). IR analysis showed that the uretdione configuration was maintained.

PREPARATION OF AQUEOUS POLYURETHANE DISPERSIONS

EXAMPLES 6–8

Each of the products obtained in following the procedure of Examples 3–5, respectively, was used in preparing aqueous polyurethane dispersions. Each product was added to a mixture containing water and sodium hydroxide. The amount of sodium hydroxide added was equivalent to the amount theoretically required to neutralize the carboxylic acid groups in the polyurethane oligomer. A polyurethane oligomer/water ratio of ½ was employed. In each case, a stable dispersion of low viscosity was obtained.

EXAMPLES 9–11

Additional aqueous polyurethane dispersions were prepared in accordance with the procedure of Examples 6–8, employing each of the products obtained in following the procedure of Examples 3–5, respectively. In these examples, however, a polyurethane oligomer/water ratio of ¼ was used. In each example, a stable dispersion of low viscosity was obtained.

PREPARATION OF WOOD MOLDINGS

EXAMPLES 12–14

Wood chips[1] were admixed with the aqueous polyurethane dispersions of Examples 6–8, respectively, containing 33% solid polyurethane oligomer product. The mixtures were formed into square mats (6"×6") and then placed in a mold preheated to a temperature of 350° F. The mats were subjected to a molding temperature of 350° F. and a pressure of 500–700 psig for 15 minutes. The molded products, containing 5% polyurethane oligomer product, demonstrated excellent binding properties.

[1] Commercially available from Wilner Wood Products Co., Norway, Maine, under the designation "PINE DRI", understood as consisting of white pine wood (moisture content: 8%, particle size: 8–20 mesh).

What is claimed is:

1. A process for preparing a polyurethane oligomer, comprising the steps of:
   (a) reacting a uretdione group-containing organic polyisocyanate with an isocyanate reactive hydrogen atom-containing compound in an equivalent ratio of NCO to OH ranging from about 1/6 to about 1/1.8 to form a hydroxyl-terminated prepolymer, said isocyanate reactive hydrogen atom-containing compound having a molecular weight from about 62 to about 7,000 and an average functionality from about 2 to about 8; and
   (b) reacting said hydroxyl-terminated prepolymer with a dicarboxylic acid anhydride to form a polyurethane oligomer having a final free OH content from about 0.2 to about 10 percent and a carboxylic acid group content from about 0.6 to about 13 percent.

2. The process of claim 1, wherein said uretdione group-containing organic polyisocyanate and said isocyanate reactive hydrogen atom-containing compound are reacted in an equivalent ratio of NCO to OH ranging from about ⅓ to about ½.

3. The process of claim 1, wherein said polyurethane oligomer has a final free OH content from about 0.5 to about 7 percent and a carboxylic acid group content from about 1.3 to about 11.1 percent.

4. The process of claim 3, wherein said polyurethane oligomer has a final free OH content from about 1 to about 4.2 percent and a carboxylic acid group content from about 2.5 to about 6.3 percent.

5. The process of claim 1, wherein said uretdione group-containing organic polyisocyanate is derived from 2,4-toluene diisocyanate.

6. The process of claim 1, wherein said isocyanate reactive hydrogen atom-containing compound has a molecular weight from about 100 to about 3,000 and an average functionality from about 2 to about 4.

7. The process of claim 1, wherein said dicarboxylic acid anhydride is an unsubstituted or substituted anhydride selected from the group consisting of maleic anhydrides, succinic anhydrides and glutaric anhydrides.

8. The process of claim 7, wherein said dicarboxylic acid anhydride is maleic anhydride.

9. A process for preparing a polyurethane oligomer, comprising the steps of:
   (a) reacting a uretdione group-containing organic polyisocyanate with an isocyanate reactive hydrogen atom-containing compound in an equivalent ratio of NCO to OH ranging from about ⅓ to about ½ to form a hydroxyl-terminated prepolymer, said isocyanate reactive hydrogen atom-containing compound having a molecular weight from about 100 to about 3,000 and an average functionality from about 2 to about 4; and (b) reacting said hydroxyl-terminated prepolymer with a dicarboxylic acid anhydride, which is an unsubstituted or substituted anhydride selected from the group consisting of maleic anhydrides, succinic anhydrides and glutaric anhydrides, to form a polyurethane oligomer having a final free OH content from about 0.5 to about 7 percent and a carboxylic acid group content from about 1.3 to about 11.1 percent.

10. The process of claim 9, wherein said polyurethane oligomer has a final free OH content from about 1 to about 4.2 percent and a carboxylic acid group content from about 2.5 to about 6.3 percent.

11. The process of claim 10, wherein said uretdione group-containing organic polyisocyanate is derived from 2,4-toluene diisocyanate, said isocyanate reactive hydrogen atom-containing compound is trimethylolpropane and said dicarboxylic acid anhydride is maleic anhydride.

12. A polyurethane oligomer prepared according to the process of claim 1.

13. A polyurethane oligomer prepared according to the process of claim 9.

14. A polyurethane oligomer prepared according to the process of claim 11.

15. A process for preparing an aqueous polyurethane dispersion, comprising the steps of:

(a) reacting a uretdione group-containing organic polyisocyanate with an isocyanate reactive hydrogen atom-containing compound in an equivalent ratio of NCO to OH ranging from about 1/6 to about 1/1.8 to form a hydroxyl-terminated prepolymer, said isocyanate reactive hydrogen atom-containing compound having a molecular weight from about 62 to about 7,000 and an average functionality from about 2 to about 8;

(b) reacting said hydroxyl-terminated prepolymer with a dicarboxylic acid anhydride to form a polyurethane oligomer having a final free OH content from about 0.2 to about 10 percent and a carboxylic acid group content from about 0.6 to about 13 percent; and (c) neutralizing the carboxylic acid groups in said polyurethane oligomer with a neutralizing agent and dispersing said polyurethane oligomer in an aqueous solution.

16. The process of claim 15, wherein said neutralizing agent is selected from the group consisting of water soluble alkali metal hydroxides, alkali metal carbonates, alkali metal bicarbonates, ammonia, amines and mixtures thereof.

17. The process of claim 16, wherein said neutralizing and said dispersing are carried out simultaneously at a temperature ranging from about 25° C. to about 75° C.

18. A process for preparing an aqueous polyurethane dispersion, comprising the steps of:

(a) reacting a uretdione group containing organic polyisocyanate with an isocyanate reactive hydrogen atom-containing compound in an equivalent ratio of NCO to OH ranging from about ⅓ to about ½ to form a hydroxyl-terminated prepolymer, said isocyanate reactive hydrogen atom-containing compound having a molecular weight from about 100 to about 3,000 and an average functionality from about 2 to about 4;

(b) reacting said hydroxyl-terminated prepolymer with a dicarboxylic acid anhydride, which is an unsubstituted or substituted anhydride selected from the group consisting of maleic anhydrides, succinic anhydrides and glutaric anhydrides, to form a polyurethane oligomer having a final free OH content from about 0.5 to about 7 percent and a carboxylic acid group content from about 1.3 to about 11.1 percent; and (c) neutralizing the carboxylic acid groups in said polyurethane oligomer with a neutralizing agent selected from the group consisting of water soluble alkali metal hydroxides, alkali metal carbonates, alkali metal bicarbonates, ammonia, amines and mixtures thereof and dispersing said polyurethane oligomer in an aqueous solution.

19. The process of claim 18, wherein said polyurethane oligomer has a final free OH content from about 1 to about 4.2 percent and a carboxylic acid group content from about 2.5 to about 6.3 percent.

20. The process of claim 19, wherein said uretdione group-containing organic polyisocyanate is derived from 2,4-toluene diisocyanate, said isocyanate reactive hydrogen atom-containing compound is trimethylolpropane and said dicarboxylic acid anhydride is maleic anhydride.

21. An aqueous polyurethane dispersion prepared according to the process of claim 15.

22. An aqueous polyurethane dispersion prepared according to the process of claim 18.

23. An aqueous polyurethane dispersion prepared according to the process of claim 20.

24. A process for the preparation of a lignocellulosic composite material, comprising the steps of: contacting a plurality of lignocellulosic particles with a binder composition; and then forming said contacted particles into a composite material by the application of heat and pressure, said binder composition comprising an aqueous polyurethane dispersion prepared according to the process of claim 15.

25. A process for applying a coating composition to a substrate, said composition comprising an aqueous polyurethane dispersion prepared according to the process of claim 15.

* * * * *